(12) United States Patent
Quach et al.

(10) Patent No.: US 6,678,837 B1
(45) Date of Patent: Jan. 13, 2004

(54) PROCESSOR CONTROL FLOW MONITORING USING A SIGNATURE TABLE FOR SOFT ERROR DETECTION

(75) Inventors: Nhon Quach, San Jose, CA (US); SeongWoo Kim, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 09/608,404

(22) Filed: Jun. 30, 2000

(Under 37 CFR 1.47)

(51) Int. Cl.[7] .................................................. G06F 11/00
(52) U.S. Cl. ........................................ 714/38; 712/244
(58) Field of Search .............................. 714/38, 39, 48, 714/34, 35, 37, 30, 27, 32; 712/205, 206, 208, 228, 244, 235

(56) References Cited

U.S. PATENT DOCUMENTS

| | | | | |
|---|---|---|---|---|
| 5,526,485 A | * | 6/1996 | Brodsky | 395/183.14 |
| 6,173,386 B1 | * | 1/2001 | Key et al. | 712/10 |
| 6,205,560 B1 | * | 3/2001 | Hervin et al. | 714/34 |
| 6,327,677 B1 | * | 12/2001 | Garg et al. | 714/37 |
| 6,513,110 B1 | * | 1/2003 | Keppel et al. | 712/227 |

* cited by examiner

*Primary Examiner*—Nadeem Iqbal
(74) *Attorney, Agent, or Firm*—Blakely, Sokoloff, Taylor & Zafman LLP

(57) ABSTRACT

A method and an apparatus for providing integrity of processor control codes in a processing unit are described. In one embodiment, a processing unit contains three circuits where the first circuit further includes an instruction buffer. The second circuit is coupled to the first circuit and contains at least one execution unit. The third circuit is coupled to the first circuit and contains a memory, wherein the third circuit stores error detection code for detecting errors in processor control codes.

16 Claims, 7 Drawing Sheets

500

| SIGNATURE 506 | TAG 504 | VALID 502 | ENTRY 1 |
|---|---|---|---|
| SIGNATURE 506 | TAG 504 | VALID 502 | ENTRY 2 |
| • | • | • | • |
| • | • | • | • |
| SIGNATURE 506 | TAG 504 | VALID 502 | ENTRY X |

FIG. 4

PROCESSOR CONTROL FLOW MONITORING USING A SIGNATURE TABLE FOR SOFT ERROR DETECTION

BACKGROUND OF THE INVENTION

1. Field of the Invention

The present invention relates generally to the field of computer systems and, more specifically, the present invention relates to a method of error detection.

2. Description of the Related Art

Process technology scaling improves overall system performance by increasing transistor density and reducing power consumption. Both of these factors, however, make processors prone to soft (or transient) errors. A soft error occurs when a logical value of a memory cell or a logic element is erroneously changed to the opposite logical value as a result of alpha particle and neutron bombardments. Thus, soft errors may corrupt processor states, including processor control code which has instructions that control various processor states. Accordingly, protecting against soft errors in the control code improves the reliability of microprocessors.

One of the simplest error protection techniques is to duplicate an entire processor and compare the outputs of the two processors for any differences. This technique is limited due to its high cost.

Parity and error correction are easy to implement and commonly used to protect on-chip memory arrays, but are less commonly used on other non-structured elements (e.g., control logic, which is often implemented as random logic). Soft errors in the control logic can be fatal because they affect the instruction sequencing and/or the instruction integrity of the execution stream. In the past, soft errors are typically left unprotected because they were difficult to protect and they were relatively rare for the prior art process technology being used. With advances in scaling technology, soft errors can no longer be ignored.

Control flow monitoring has been performed in the prior art. Conventionally, control flow monitoring requires a compiler to compute and insert a checksum for each basic block of instructions in the code and rely on the processor hardware to compare checksums generated by the hardware itself and by the compiler. This approach is not flexible because it requires modification (and therefore recompilation) of the applications.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a block diagram of an embodiment of a signature table for storing signatures.

DETAILED DESCRIPTION

Figure 1:
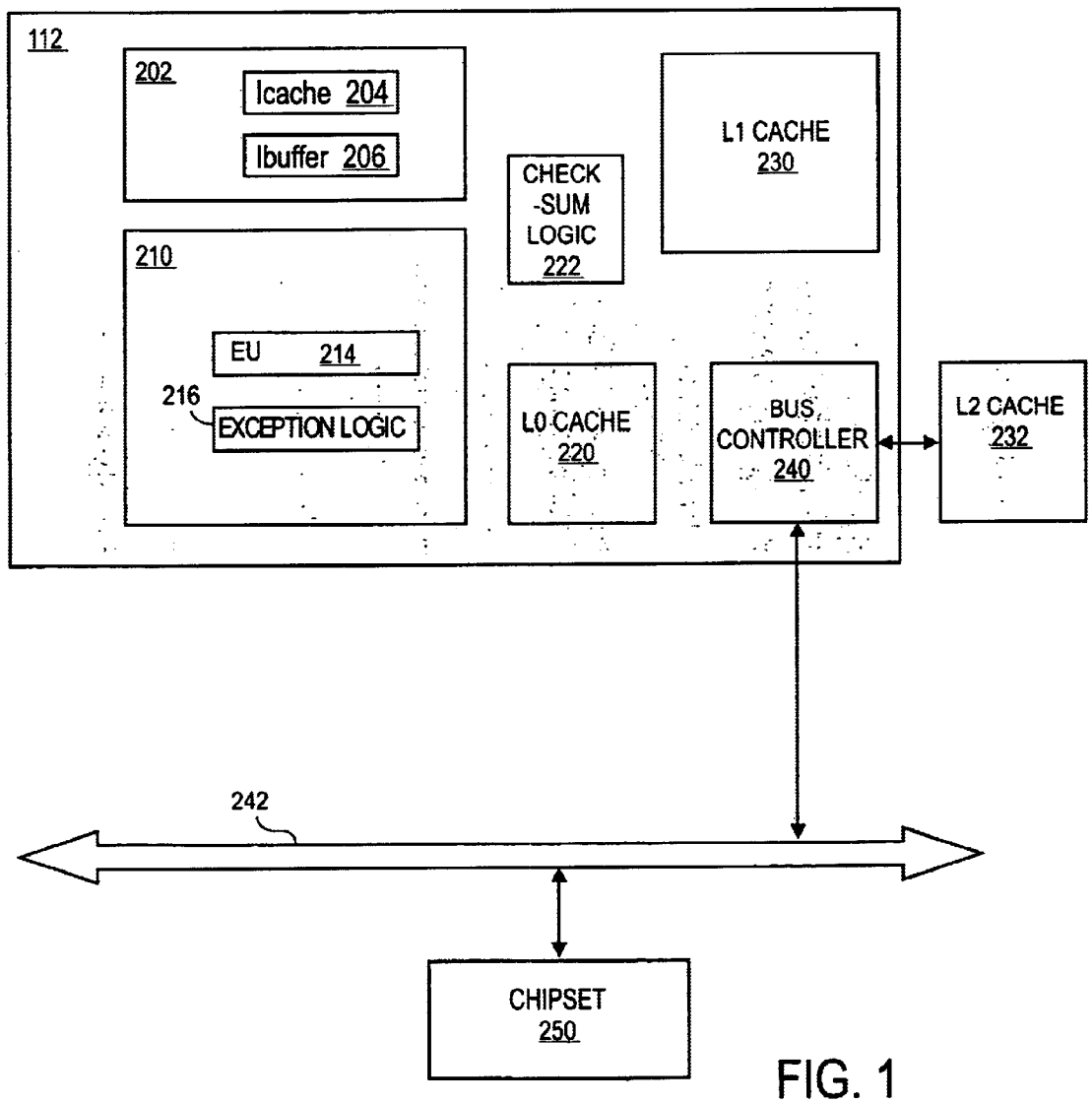
FIG. 1 illustrates one embodiment of a system with a processor including checksum logic.

A method and apparatus for processor control flow monitoring are described. In one embodiment, the processor control flow monitoring protects control logic in a processor by checking the integrity of instructions and their correct sequencing beginning from the time instructions are fetched from an instruction cache to their retirement. In this manner, errors in the control logic may be detected. In one embodiment, this monitoring is hardware-based and transparent to the compiler and the operating system (OS).

For purposes of explanation, in the following description numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory deices; electrical, optical, acoustical or other form of propagated signals (e.g., carrier waves, infrared signals, digital signals, etc.); etc.

OVERVIEW

In the present invention, processor control flow monitoring is performed using control in a processor. This control logic detects soft errors. In one embodiment, the control logic detects errors by monitoring the datapath of the instructions from cache memories, memory arrays and other non-structured elements to the consuming units in the processor (e.g., the execution core). In one embodiment, the control logic computes and maintains signatures of instructions in a basic block in a small table, referred to herein as the signature table, in the processor. A basic block is a block of instruction that has only one entry point and one exit point. In one embodiment, a signature is a k-bit wide error detection code and is generated on-the-fly based on instructions in the basic block. Whenever a basic block is executed the first time, its signature is computed and stored in the signature table. When the same basic block is executed again, its signature is computed again and then compared with the one stored in the signature table. A mismatch in the signatures causes the processor to take a machine check abort (MCA) or halt execution completely. In this way, errors are detected and prevented from propagating to locations outside the processor.

FIG. 1 is a block diagram of one embodiment of a computer system 200. Referring to FIG. 1, system 200 contains a processor 112, level two (L2) cache 232, a front side bus 242, and chipset 250.

In one embodiment, processor 112 comprises a front end 202, a backend 210, a level zero (L0) cache 220, a level one (L1) cache 230, a bus controller 240, and checksum logic 222. Front end 202 further contains instruction cache (Icache) 204 and instruction buffer (Ibuffer) 206. Icache 204 and Ibuffer 206 are temporary storage locations for storing instructions. Backend 210 comprises an execution unit (EU) 214 and exception logic 216, among other functional units.

Front end 202 fetches a set of instructions from L1 cache 230 and stores the fetched instructions in Icache 204. If the instructions being fetched are not found in L1 cache 230, the processor may either go to L2 cache 232 or the main memory (not shown) to locate the instructions. When instructions are found in Icache 204, the processor 112 loads the instructions into Ibuffer 206 for subsequent execution by execution unit 214 in backend 210.

As instructions are sent to backend 210, checksum logic 222 monitors the instruction flow and computes checksums for each basic block to create a signature for each basic block. A basic block is a set of instructions that do not contain branches or interrupts. In one embodiment, the signature is created by exclusive-oring the instruction stream with itself. The result of the computation is compared to previously generated signatures stored in a signature table using checksum logic 222. In the event of a mismatch, checksum logic 222 signals exception logic 216 to generate an exception to handle the instructions that mismatched. In this manner, checksum logic 222 may prevent soft errors that cause the output of processor 112 to be incorrect.

Figure 2:
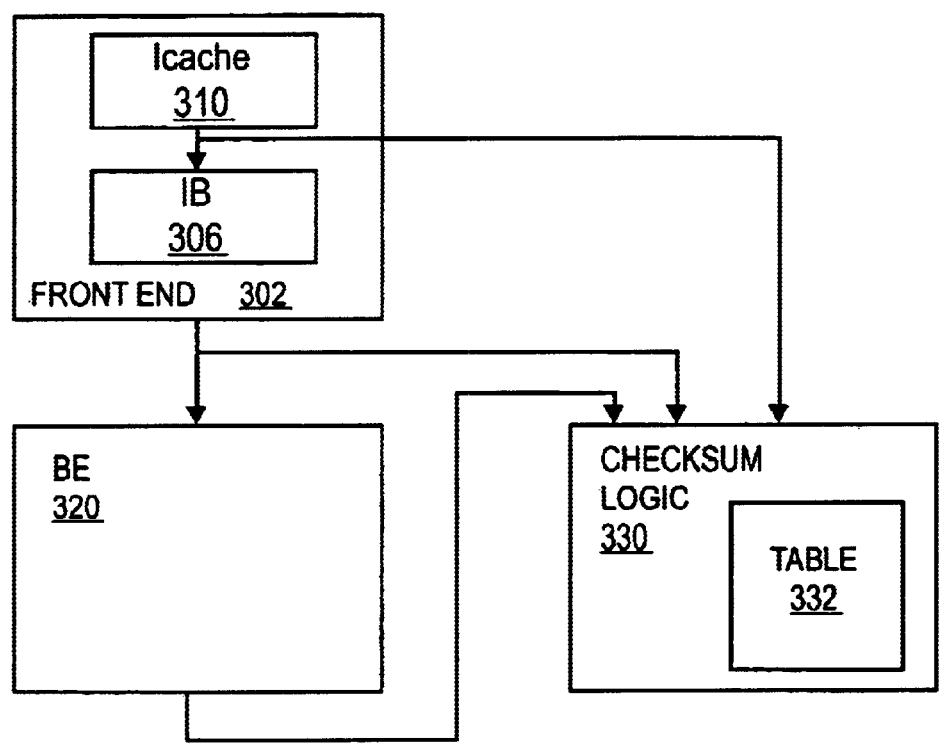
FIG. 2 illustrates one embodiment of a hardware based processor control flow monitoring logic for detecting errors.

FIG. 2 illustrates one embodiment of a hardware-based processor control flow monitoring mechanism 300 for detecting errors. Processor 300 contains an Icache 310, a front end 302, a backend 320, and checksum logic 330. Front end 302 contains Icache 310 and an instruction buffer ("IB") 306. Checksum logic 330 contains a signature table 332.

In one embodiment, checksum logic 330 generates a signature for each basic block of instructions. In one embodiment, each signature is a k-bit wide error detection code ("EDC"), in which k could be 1, 2, 4, 8, 16, etc. An EDC may be generated by performing a logic function, such as an exclusive-OR function, on a basic block of instructions. In one embodiment, checksum logic 330 generates a unique EDC for each basic block of instructions. After the EDC is generated, it is stored in signature table 332 as a signature associated with the basic block.

Once the signature is stored, each subsequently generated EDC for the same basic block will be compared against the signature stored in signature table 332. If the newly generated EDC matches the signature stored in the signature table 332, no error has occurred. Conversely, if the newly generated EDC mismatches the signature stored in signature table 332, at least one error has occurred.

When an error is detected, the checksum logic 330 issues an exception (e.g., MCA) indicating an error has occurred. In one embodiment, checksum logic 330 receives inputs from different components, such as FE 302 or BE 320, which may help to identify where the error has occurred. For example, when a basic block of instructions flows from Icache 310 to BE 320, checksum 330 indicates an error occurred in IB 306 if the EDC from PF 304 matches with the signature stored in signature table 332 while the EDC from IB 306 mismatches with the signature.

Figure 3:
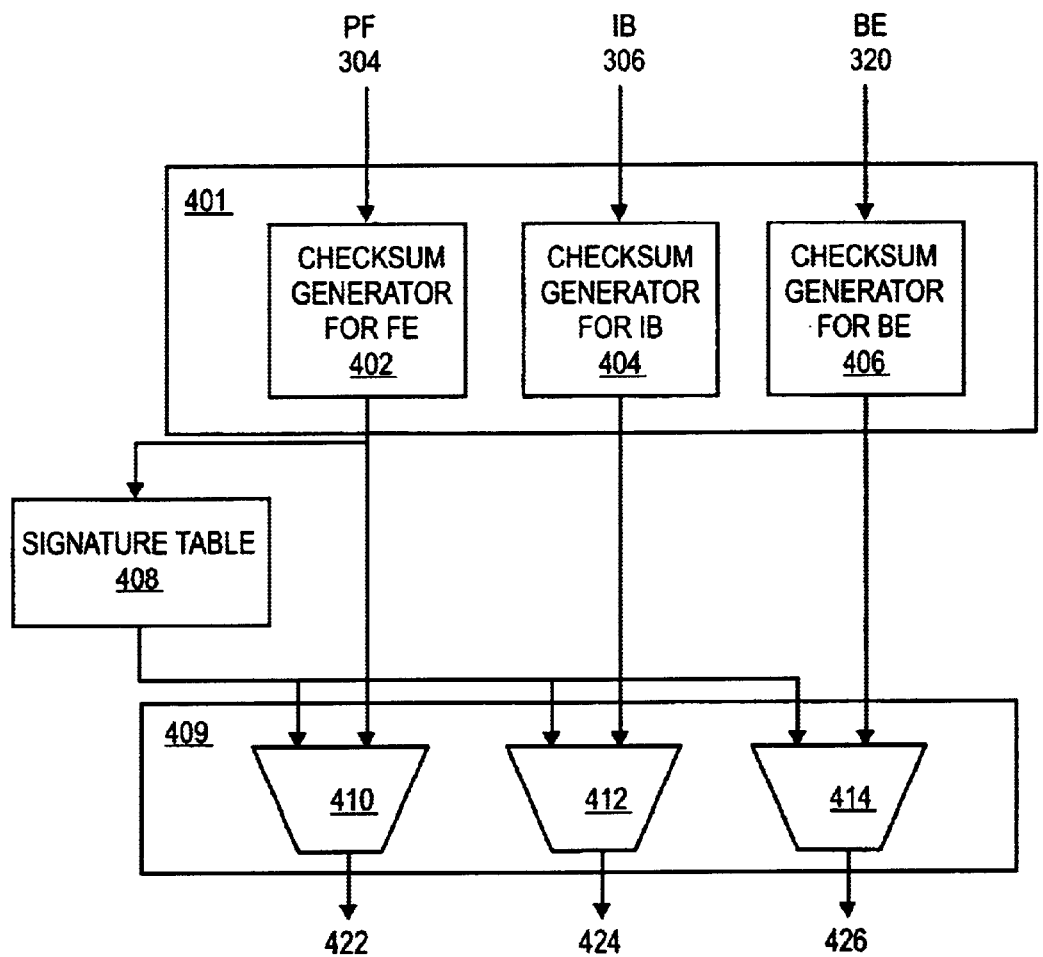
FIG. 3 illustrates one embodiment of a checksum for detecting errors.

FIG. 3 is a block diagram of one embodiment of a checksum logic 400 for detecting errors. Referring back to FIG. 3, checksum 400 contains check logic 401, a signature table 408, and a compare logic 409. Check logic 401 further includes a checksum generator ("CG") 402 for front end ("FE"), a CG 404 for IB, and a CG 406 for BE. Also, compare logic 409 includes three compare circuits 410–414. It is apparent to one of ordinary skill in the art that other functional blocks may be included in checksum logic 400.

Check logic 401 receives inputs from PF 304, IB 306, and BE 320 and generates separate EDCs based on the inputs. Signature table 408 stores a set of EDCs (signatures).

Compare logic 409 compares one or more signatures stored in signature table 408 with EDCs from check logic 401. For example, compare circuit 410 compares the signature from the signature table 408 with an EDC generated by CG 402 for FE, compare circuit 412 compares the signature from the signature table 408 with an EDC generated by CG 404 for IB, and compare circuit 414 compares the signature with an EDC generated by CG 406 for BE. Note that the more checksum generation logic, the higher the fault coverage. Advantageously, at least one CG is in the FE.

In an alternative embodiment, compare logic 409 skips the comparison step if the signature associated with a particular basic block cannot be found in the signature table 408.

Compare logic 409 indicates an error exists if a mismatch between the signature associated with the basic block in the signature table 408 and the EDC generated by check 401. In one embodiment, compare logic 409 determines where the mismatch (or errors) has occurred. For example, if result 422 of compare circuit 410 indicates a mismatch, it indicates that a mismatch has occurred at PF 304. Similarly, if result 426 of compare circuit 414 indicates a mismatch while results 410 and 412 indicate matches, it may indicate that at least one error has occurred at BE 320. For one embodiment, BE 320 retires or releases each instruction at the end of the execution. Retirement of an instruction at BE 320 indicates that the instruction has been successfully executed (without error).

For one operation, when a basic block of instructions flow from PF 304 to BE 320, check logic 401 receives inputs from PF 304, IB 306, and BE 320 and generates three EDCs according to the inputs from PF 304, IB 306, and BE 320, respectively. If the EDC generated by CG for FE 402 is the first time for the basic block, the EDC is stored in the signature table 408 as the signature of the basic block. For one embodiment, checksum logic 400 skips comparison step if the EDC is the first time for the basic block. If a corresponding signature is found in the signature table 408, the EDCs generated from CG 402 for FE, CG 404 for IB, and CG 406 for BE are fed to compare circuits 410–414, respectively, for performing the comparison. Checksum logic 400 evaluates the results 422–426 of the compare circuits 410–414 and issues the error indication (e.g., MAC) if at least one mismatch has been found.

FIG. 4 is a block diagram of an embodiment of a signature table 500. Signature table 500 contains multiple entries where each entry contains a signature 506, tag 504, and a valid bit 502. Other fields may be added in the signature table 500, but they are not pertinent to understanding the present invention.

In one embodiment, tag 504 is a field for storing an identification of a specific basic block of instructions. For example, tag 504 stores an instruction pointer that points to the first instruction of the basic block. Signature 506 is a field for storing a signature associated with the basic block. Signature 506 may have multiple bits.

Valid bit 502 indicates whether the entry is a valid or invalid signature. In one embodiment, when a signature or EDC is properly generated and stored in the signature field 506, the corresponding valid bit 502 is set, which indicates a valid signature entry. On the other hand, when an override, an interrupt, or a machine check has occurred, the corresponding valid bit is reset, which indicates the entry is invalid. In one embodiment, an override occurs when an entry within a signature table 500 is reassigned to a different basic block.

Figure 5:
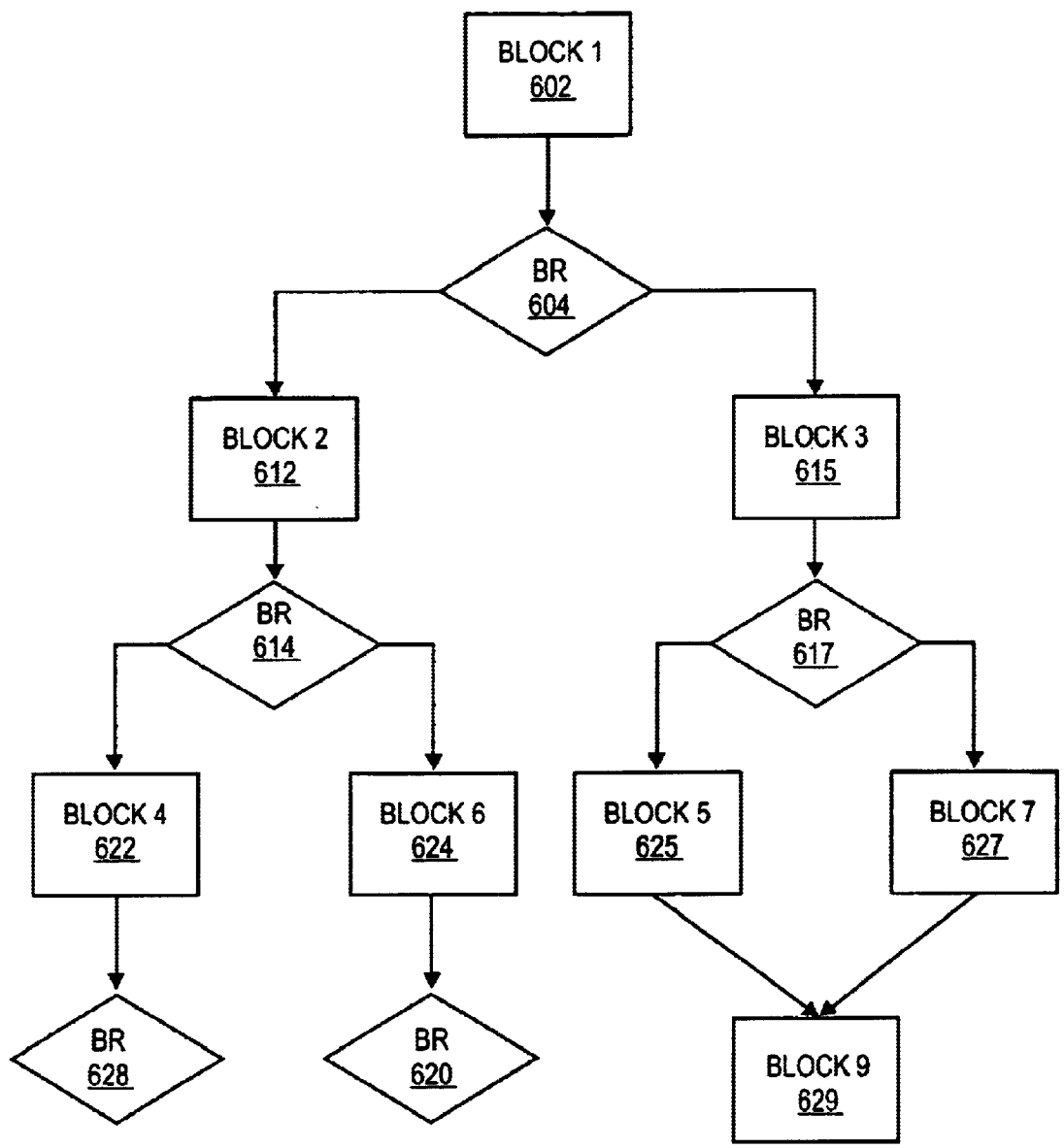
FIG. 5 is a flowchart illustrating an embodiment of processor control code having multiple blocks.

FIG. 5 is a flowchart illustrating an embodiment of processor control code 600 having multiple blocks of instructions. A processor control code may contain multiple basic blocks and branches separating the basic blocks. For one embodiment, a block of instructions or control code may start after the branch instruction and end before the next branch instruction. Referring back to FIG. 5, blocks 1–7 contain no branches. For one embodiment, basic blocks may also be located between merge blocks. The merge block is a block allowing multiple blocks to merge into the merge block. For example, block 5 and block 7 merge into block 9. For one embodiment, a large block may be subdivided into multiple smaller blocks for finer granularity. For a conventional computer system, a process tends to stay in just a few basic blocks for every task. Accordingly, if the scheme of basic block is divided efficiently, the error detection process can be very effective.

Figure 6:
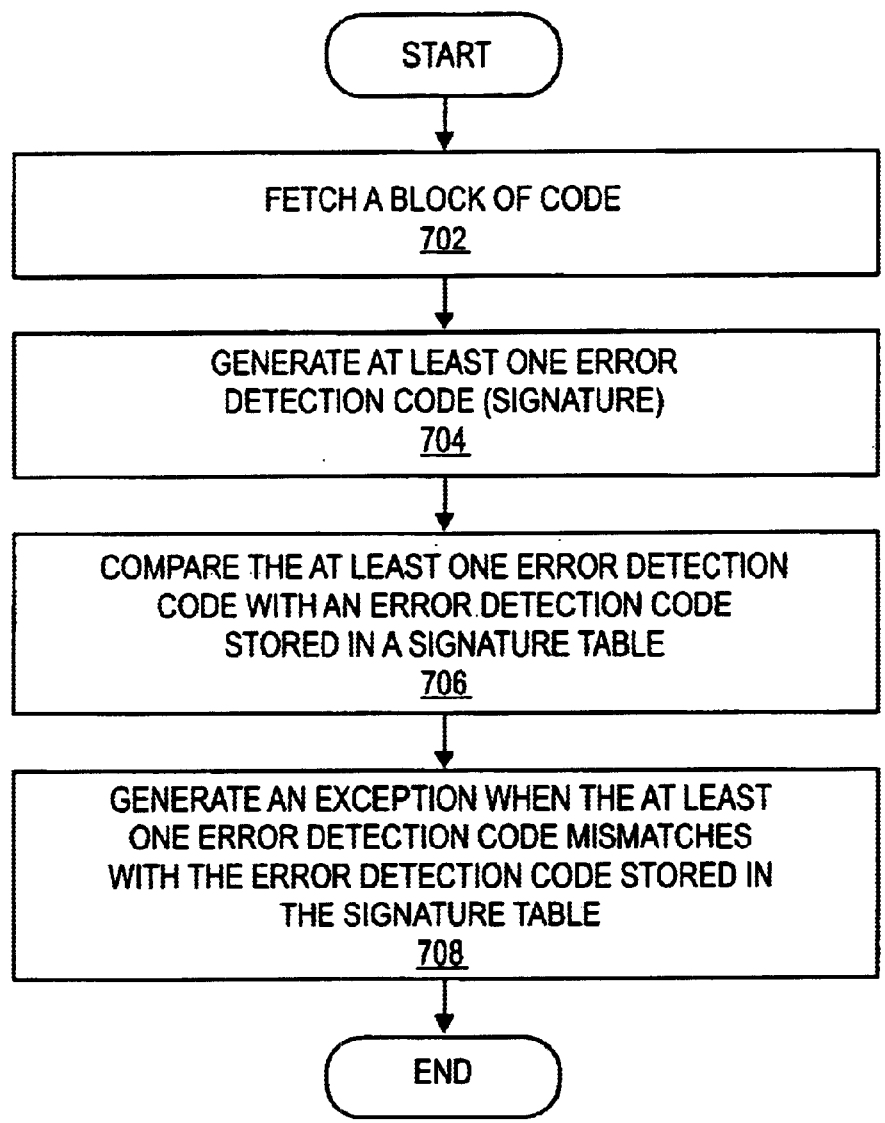
FIG. 6 is a flowchart illustrating an embodiment of process for detecting errors.

FIG. 6 is a flowchart 700 illustrating an embodiment of process for detecting errors. The process begins with fetching a block of code (block 702). In one embodiment, the block of code is a group of instructions. Next, at block 704, the process generates at least one EDC (signature) for a particular block of code. The process then proceeds to compare the at least one EDC with a signature stored in the signature table for that block of code (block 706). After the comparison, the process proceeds to generates an exception. When a mismatch between the signature for that block of code stored in the signature table and EDC is found, after which the process ends.

Figure 7:
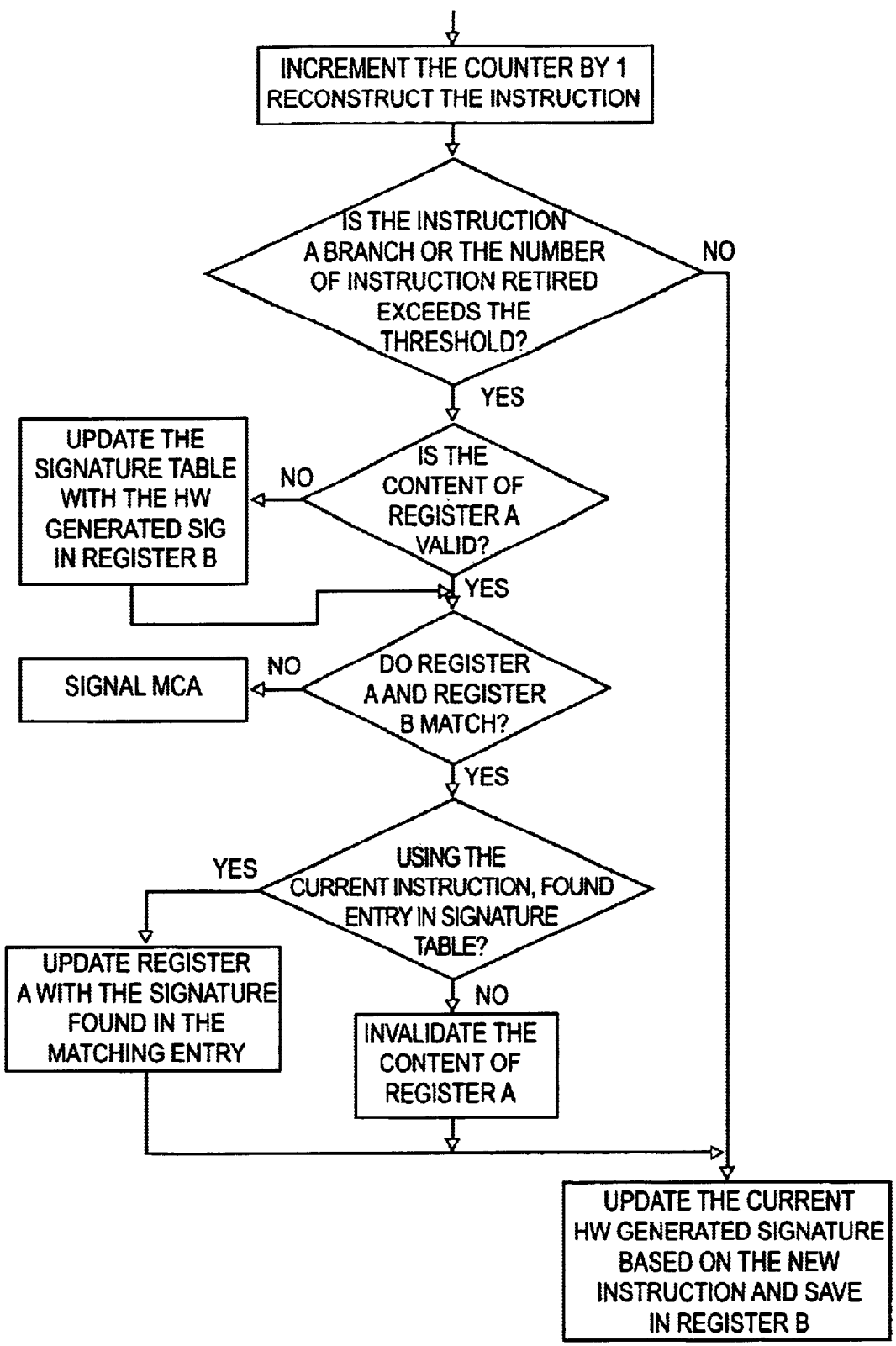
FIG. 7 is a more detailed flow diagram of the process for signature generation and checking for control flow monitoring.

FIG. 7 illustrates a more detailed flow chart. Note that register A in the flow chart contains the signature looked up in the signature table and register B contains the signature generated on-the-fly by the monitoring hardware.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

We claim:

1. A method comprising:

fetching a first block of code from a storage location in a processor;

generating a first signature based on the first block of code;

comparing the first signature with a previously generated second signature that is stored in a signature table, wherein the second signature is generated based on a second block of code, which is executed before and is identical to the first block of code; and issuing an exception when the first signature mismatches the second signature.

2. The method of claim 1, wherein the first signature comprises an error detection code.

3. The method of claim 1, further comprising:

storing the first signature in an entry of the signature table when no other entry exists in the signature table that contains a tag which corresponds to the first block of code; and setting a valid bit in the entry of the signature table to indicate the first signature is valid.

4. The method of claim 3, further comprising setting the valid bit to invalid when an interrupt has occurred.

5. The method of claim 1, wherein the generating of signatures comprises performing an exclusive-OR logic operation on the block of code.

6. The method of claim 1, wherein comparing the first signature with the second signature comprises matching at least one error detection code with an error detection code stored in a field of the signature table.

7. A method comprising:
fetching a first instruction from a storage location in a processor;
storing a first signature, which is generated based on the first instruction, in a signature table;
fetching a second instruction from a storage location in the processor, wherein the second instruction is the same as the first instruction;
generating a second signature based on the second instruction
comparing the second signature with the first signature, which is stored in the signature table; and
issuing an exception when the second signature does not match the first signature.

8. A device comprising:
a first circuit containing an instruction buffer to fetch a first instruction;
a second circuit coupled to the first circuit and containing at least one execution unit to execute the first instruction; and
a third circuit coupled to the first circuit and to memory, wherein the third circuit generates a first signature based on the first instruction and stores the first signature in memory, if no entry in memory exists that corresponds to the first instruction.

9. The device of claim 8, wherein, if an entry in the memory exists that corresponds to the first instruction, the third circuit compares the first signature to a second signature contained in the corresponding memory entry and issues an exception if the first and second signatures do not match.

10. The device of claim 8, wherein the second circuit is a front-end logic including at least one of an instruction buffer, a prefetch logic, and a instruction decoder.

11. The device of claim 8, wherein the second circuit is a back-end logic including at least one of an integer execution unit, a floating-point unit, a register file, and a input/output interface.

12. The device of claim 8, wherein the third circuit contains checksum logic that generates the signature based on the first instruction.

13. The device of claim 8, wherein the memory contains a signature table comprising a valid field, a tag field, and a signature field.

14. The device of claim 8, wherein the signature is generated by an exclusive OR logic device.

15. The device of claim 8, wherein the device is a processor chip integrated in a single integrated circuit.

16. The device of claim 8, wherein the instructions generate a set of control programs.

* * * * *

UNITED STATES PATENT AND TRADEMARK OFFICE
CERTIFICATE OF CORRECTION

PATENT NO. : 6,678,837 B1
DATED : January 13, 2004
INVENTOR(S) : Quach et al.

Page 1 of 1

It is certified that error appears in the above-identified patent and that said Letters Patent is hereby corrected as shown below:

Column 3,
Line 20, delete "deices" and insert -- devices --.

Signed and Sealed this

Twenty-seventh Day of April, 2004

JON W. DUDAS
*Acting Director of the United States Patent and Trademark Office*